Dec. 23, 1969   H. T. FINDLAY ET AL   3,485,903
PROCESS OF MAKING A SPONGEOUS TRANSFER MEDIUM
Filed May 3, 1967

INVENTORS.
HUGH T. FINDLAY
WILLIAM H. HORNE

BY  *John A. Brady*
ATTORNEY.

3,485,903
PROCESS OF MAKING A SPONGEOUS
TRANSFER MEDIUM
Hugh T. Findlay and William H. Horne, Lexington, Ky., assignors to International Business Machines Corporation, Armonk, N.Y., a corporation of New York
Filed May 3, 1967, Ser. No. 635,864
Int. Cl. B29d 27/04; B29h 7/20; B29c 25/00
U.S. Cl. 264—41                 10 Claims

ABSTRACT OF THE DISCLOSURE

The specifics of this patent specification describe processes to produce a porous or matrix transfer medium in which the liquid ink does not completely fill the pores of the transfer layer, and which is therefore resistant to environmental factors, particularly high humidity. In one embodiment a matrix layer is formed of a hygroscopic, resinous material on a paper. In another embodiment a matrix layer of a hygroscopic, resinous material is formed on a non-absorptive substrate and then the matrix layer is sandwiched between paper. In both cases the final lamination is treated in an atmosphere of 90 degrees Fahrenheit and 90 percent relative humidity, for at least 24 hours and then the paper is removed. In that manner, ink is squeezed from the pores of the transfer layer and absorbed by the paper. This prevents some environments from forcing ink to the matrix surface where the ink subsequently splatters during printing and where it also may impair handling of the transfer medium. Without regard to the removing of ink from the pores, the treatment during processing is useful with paper and other casting substrates to loosen the matrix layer from the substrate.

---

The spongeous or matrix transfer technology is becoming fairly well understood in certain respects and is basically known in the art, as illustrated by U.S. patent application Ser. No. 536,557, filed Mar. 9, 1966, and now Patent 3,413,184, issued Nov. 26, 1968, entitled Transfer Medium and Method for Making Same by Hugh T. Findlay and Kenneth H. Froman, and assigned to the same assignee as this invention is assigned. (The above is partly based on subject matter largely published on July 29, 1964, in United Kingdom patent specification 965,517.) The matrix transfer layer is basically a layer of film forming resin having a porous structure with a fluid marking material held in those pores generally in the manner of a sponge. The matrix transfer material may be formed by several, different known processes, and the product may include a supporting layer and other structures.

The gist of one aspect of the invention here described is in the intentional depletion of a small amount of ink from the pores of the matrix as a part of the fabrication of a transfer medium and prior to the first normal use of it as a transfer medium. No pertinent prior art in this regard is known, but the basic physical chemistry used during the processing is essentially well known.

In the prior art the matrix is generally formed from raw materials around the fluid ink. Generally, the resin body of the matrix is initially held in solution by a dispersing solvent for that resin, and the liquid and other ink materials are in dispersion in the same solution with the resin body. That solution is cast onto a support and the matrix transfer layer is formed by driving off only the materials solvating the resin body. In that technique, therefore, and in all other pertinent techniques known, the resulting product when ready for initial use has pores essentially entirely filled with the fluid marking material.

We have determined that if the resin body is hygroscopic, certain atmospheric conditions can cause spontaneous accumulation of the fluid ink on the surface of such matrix transfer mediums. Such surface ink tends to splatter during printing to thereby impair the quality of the printing. Such surface ink not only causes the transfer medium to be dirty during normal handling, but it tends to build upon the guide members in the feeding mechanisms of a typewriter using a ribbon made of such a matrix transfer medium. This build-up of fluid ink drags against ribbon feeding mechanisms and can substantially impair proper feeding as a typewriter ribbon.

No significant change is observed or known from the quality and density of the printed image obtained by the product in accordance with this invention as compared with the printing obtained from essentially the same product not in accordance with this invention. The print quality obtained is therefore excellent and generally as good as that obtained by all but the most expensive transfer mediums, and no significant change in print quality can be attributed to this invention.

Certain casting techniques for matrix transfer mediums include the stripping of the solid matrix layer after that layer has been cast and solidified on a temporary support layer. Stripping of certain kinds of matrix layers from certain kinds of support layers has not been practical and efficient due to adhesion between the two. Paper is known for this use, but for that reason is not commercially used. In accordance with this invention, layers of a large numper of different materials can be separated by treatment in which one of the layers will absorb atmospheric material more than another and thereby swell more than the other.

It is an object of this invention to produce a matrix transfer medium with reduced extrusion or bleed of ink to the surface, thereby reducing undesirable splattering during printing operations and rendering the transfer medium clean during handling and use.

It is a somewhat different object of this invention to provide a processing technique by which a large selection of different materials forming matrix transfer mediums may be cast and effectively stripped from a large selection of different materials forming temporary supports.

In accordance with this invention a matrix transfer medium formed of a film forming body and having flowable ink in its pores is treated so as to remove a significant portion of that fluid ink so that flowable ink will not be spontaneously moved to the surface of that transfer medium by subsequent environmental conditions. A hygroscopic film forming body may be treated by high humidity and high temperature while in a sandwich with an absorbent material. Preferably, bulk quantities of such a body are formed directly on such an absorbent material, and the composite is wound into a large roll and then treated. In a different, but somewhat related technique, matrix transfer material which has been made on a temporary substrate and is to be stripped from that temporary substrate is treated so that one or the other of the substrate or the matrix absorbs a material from the treatment environment and consequently swells, thereby loosening the bond between the two.

The foregoing and other objects, features and advantages of the invention will be apparent from the following more particular description of preferred embodiments of the invention, as illustrated in the accompanying drawings.

Except as detailed below, the transfer mediums here described are intended to be generally in accordance with the processes and products described in the above mentioned application Ser. No. 536,557, now Patent No. 3,413,184. In general, the body of the matrix or spongy layer in accordance with this invention is nylon mixed with significant amounts of finely divided filler. Nylon is prefered because of its inherent strength and resistance to cutting under the direction impact of a type die. It has also been found generally necessary in the design of typewriter ribbons to provide a support layer, and that layer generally should not contain liquid ink and other ingredients sufficient to weaken the support layer against being cut by impacting type dies. In carbon papers, the backing layer protects the prior paper sheet from being printed upon by the transfer medium under it.

Consequently, Example I of the above mentioned Patent No. 3,413,184 may be considered basically descriptive of the more specific aspects of the preferred embodiment here, except to the extent that differences are pointed out or are apparent. Also, generally, a woodflour filler is the preferred filler. Nylon is the material of which the resin body of that matrix medium is formed. Nylon is quite hygroscopic. As the nylon absorbs water from the atmosphere, it swells. Therefore, to prevent ink from being spontaneously expressed at times to the printing surface of the transfer layer after fabrication is complete, the following is the preferred process.

Figure 1:
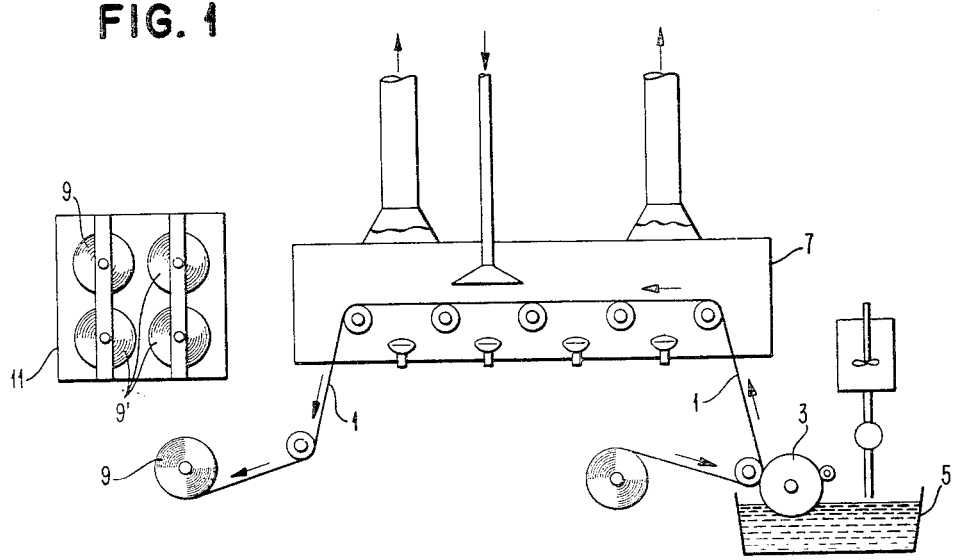
FIG. 1 is illustrative of the preferred process of forming the matrix layer on a paper substrate, and the treating in a humidity controlled atmosphere.

Reference is made to FIG. 1. FIG. 1 illustrates the process also shown in Patent No. 3,413,184 except that in Patent No. 3,413,184 the temporary supporting substrate 1 used as a base upon which the matrix layer is formed from raw materials and then stripped may be a non-absorptive material such as Mylar polyester terephthalate. In accordance with this invention that substrate, substrate 1 in FIG. 1 is a 6½ pound rag, carbonizing tissue paper (a product of Crane Co.). The liquid blend of raw materials containing nylon dissolved in ethyl alcohol and also dispersed marking material with an oily vehicle for the marking materials, is applied by roller 3 from reservoir 5 directly onto the tissue paper 1. Expulsion of the solvent, the ethyl alcohol, is in chamber 7 as described in Patent No. 3,413,184. A backing layer as thick as desired of nylon as described in that Example I, generally to a dry thickness of 0.0005 inch, is applied. This may be applied after first passing all of paper 1 through the applicator while applying and solidifying transfer material on it, and then moving paper 1 as a bulk roll to the start of the coater and passing it through the coater once again, this time with applicator 3 applying pure nylon in an ethyl alcohol and water mixture from reservoir 5 on top of the matrix transfer material.

More specifically, this preferred embodiment is made as follows:

Step 1

The liquid ink of ingredients as shown in the immediately following table are ground together by successive passes through a roller mill until a fineness of grind less than 1.0 is obtained on the Hegmann fineness of grind gauge.

LIQUID INK

| | Wt. percent |
|---|---|
| Black pigment 1686 dye and carbon black composition (Dye Specialties Company) | 6.0 |
| 2451L black pigment dye and carbon black composition (Paul Uhlich & Company) | 10.0 |
| Nigrosine oleate (1 part by weight nigrosine base N; 2 parts by weight oleic acid) | 63.0 |
| Methyl violet base (E. I. du Pont de Nemours and Co.) | 3.0 |
| Ohopex R-9, mixed octyl esters of oleic acid (Ohio Apex Company) | 18.0 |
| | 100.0 |

Step 2

Sixteen parts by weight of liquid ink as prepared in Step 1 is mixed with six parts by weight of Superfine woodflour (product of Composition Materials Co.). This mixture is allowed to stand for at least twenty-four hours to thereby assure high saturation of the liquids into the woodflour.

Step 3

Eight parts by weight of Zytel 61 nylon (product of E. I. du Pont de Nemours and Co.) is dissolved in 70 parts Jaysol denatured ethyl alcohol (product of ANSCO).

Step 4

The ink and woodflour of Step 2 is throughly stirred into the nylon ethyl alcohol solution of Step 3, thus yielding a raw material blend to form the transfer layer as follows:

TRANSFER LAYER BLEND

| | Wt. percent |
|---|---|
| Jaysol (denatured ethyl alcohol product of ANSCO) | 70 |
| Nylon (Zytel 61, product of E. I. du Pont de Nemours and Co.) | 8 |
| Woodflour (Superfine, product of Composition Materials Co.) | 6 |
| Liquid ink (see above formula) | 16 |
| | 100 |

The transfer layer blend is applied to the 6½ pound rag tissue by roller 3 as above described in amounts sufficient to form a dried film 0.0018 inch thick. The dried bulk roll of paper carrying the transfer layer formed is then moved to the start of the coater and then passed through the coater once again.

On this second pass, a blend of 8 parts by weight of the Jaysol denatured ethyl alcohol, 2 parts by weight water, and 2 parts by weight of the Zytel 61 nylon is applied by roller 3 to the dry, top surface of the matrix transfer layer, in quantities so that the caliper of the final matrix transfer medium, including the matrix transfer layer and the support layer, is approximately 0.0023 inch.

A composite is thus formed of a pure nylon supporting layer on the matrix transfer layer, with the matrix layer directly on the tissure paper substrate. As a part of this formation, the paper substrate 1 with the composite on it has been wrapped into a large, bulk roll 9. This moderately tight bulk roll is then placed in an environment control chamber 11 of any convenient construction along with similar rolls 9'. Then the bulk rolls 9 are treated for 72 hours at 90 degrees Fahrenheit and 90 percent relative humidity. This environment is selected because it is as conducive to absorption of moisture as the most such conducive environment encountered during normal use. Further storage of the wrapped roll 9 at normal room temperatures and conditions is recommended prior to stripping from substrate 1 for use, but essentially no further treatment is necessary. The transfer medium is then peeled from the paper substrate and cut and preferably wound into a number of individual typewriter ribbons, all essentially as described in Patent 3,413,184.

The process advantages of the above are significant in several respects. The single treatment step is an essentially economical one, and the amount of time involved is not prohibitively long. The paper substrate is an inexpensive item and may therefore be discarded after each use, a very significant saving as compared to a requirement to clean a nonexpendible substrate, such as a substrate of Mylar polyethylene terephthalate, as a prerequisite to reuse of it.

The other primary advantages are those having to do with the improved quality of the resulting product. The product does not exude free ink spontaneously to its surface after having been subjected to the highest humidity and temperature environments normally found. Thus, the product writes clean at all times instead of presenting the possibility of scattering free ink when it is used after having been in an environment conducive to swelling of the resin body of the matrix. Ink does not splatter during printing and thus randomly spot the print receiving surface around the locations of impacts. The ink free surface of the transfer medium handles better in the ribbon feed mechanisms of a typewriter since ink on the surface would tend to pile up on contact points in the typewriter and then substantially oppose the movement of the ribbon. The transfer medium is not dirty to the touch.

Figure 3:
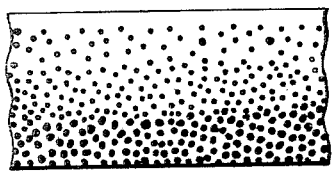
FIG. 3 is illustrative of a cross-section of the product in accordance with this invention, which shows generally the stratification of pores obtained but is not intended to show the exact structures or vacancies in the pores.

FIG. 3 is illustrative of the final product, but it should be emphasized that the exact details of such a product are not pictured and can not ordinarily be seen with useful clarity. It will be noted in FIG. 3 that an uneven dispersion or stratification of pores (shown as black bodies) and resinous body (shown as white) exists. Such stratification is discussed in the application Ser. No. 536,557, now Patent 3,413,184 above mentioned.

The stratification occurs primarily because of the relatively greater solubility of nylon than the relatively less soluble ink vehicles, as both are dispersed in the ethyl alcohol. Stratification is generally desirable since by stratification relatively large amounts of ink filled pores are positioned at the surface of the transfer medium which is to be the surface from which printing to paper or other receptive surfaces is made (pores quantity so large as to cause excessive ink flow is to be avoided, of course). The other side of the transfer medium, when the transfer medium is a typewriter ribbon, must be strong enough to withstand the cutting tendency of directly impacting type dies, and a less porous matrix on that side, which may be achieved by stratification, does exhibit stronger resistance against cutting. Since stratification is created primarily by the action of the solvent, more of the ethyl alcohol solvent should leave from the side away from the temporary substrate 1 than exits through that substrate. To achieve this, the paper chosen to serve as a temporary substrate 1 is a tightly felted one which is relatively impervious to gaseous ethyl alcohol.

In accordance with this invention, the pores of the preferred product are somewhat depleted in ink to the extend that the average pore is roughly 95 percent by volume filled with ink. No attempt was made in FIG. 3 to illustrate that partially empty state of the pores.

A by-product of significant value was developed rather directly from the above, in that the problem of practically and efficiently separating a matrix layer from any of a number of substrate materials was solved. Thus, when the transfer material and the substrate material have different hygroscopicity, a positive tendency to peeling was observed after the humidity treatment, doubtless due to the generally different expansions of the two materials. In accordance with this, therefore, any relatively hygroscopic material may be used as the substrate materials when the resin body material is relatively non-hygroscopic. Thus, cellophane has been used as the temporary substrate to form matrix layers of polyurethane, polymethyl methacrylate, polyethylene, polystyrene, nylon, Suralyn A ionomer (metal ion with ethylene-carboxy copolymer), polyphenylene oxide, cellulose acetate butyrate, polyvinyl acetate, polyvinyl chloride, and polyvinyl chloride acetate. In each case after the matrix body was solidified on the temporary substrate by driving off a solvent for the matrix body, a large, bulk roll of cellophane carrying the matrix material was treated for at least 24 hours in a relatively high humidity atmosphere. To further promote absorption of moisture the ambient temperature was somewhat elevated. In each case, after the moisture treatment, the peeling of the matrix transfer medium from the cellophane layer required only the simple application of some moderate force in directions to separate or pull apart the two materials.

Papers which have been found to function well with the above are Onyx 6½ lb. tissue paper and Fenmore 9½ lb. tissue paper, both products of Peter J. Schweitzer Company, and No. 9500 tissue paper, the product of Kimberly Clark.

Figure 2:
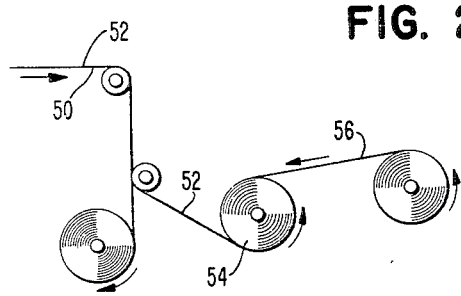
FIG. 2 is illustrative of an alternative, less preferred embodiment in which the matrix is stripped and then rolled into a lamination with paper.

Another embodiment of this invention is a modification of the above process of formation of hygroscopic matrix medium which requires some more intermediate steps and materials, but does produce the final result with relatively good economics. In this embodiment the transfer medium is formed as described above, but on a Mylar polyethylene terephthalate substrate, and then stripped as described above and in Patent 3,413,184. The stripped bulk material, however, is then wound into another large, bulk roll in a lamination with tissue paper. This is illustrated in FIG. 2.

A polyethylene terephthalate substrate 50, carrying bulk quantities of solidified matrix transfer material is directed past a station where the transfer medium 52 is peeled and rolled onto roll 54. The bulk transfer medium 52 might be 36 inches wide. Therefore, tissue paper 56 at least 36 inches wide from a large roll is fed on top of and in contact with the transfer medium and this sandwich is rolled into a large roll 54 in which the paper and transfer medium are in contact with moderate pressure. In this embodiment Flexrope 0.0012 inch caliper tissue paper, a product of John A. Manning Paper Co., is preferably used, but kraft paper is suitable and other sufficiently absorptive materials are also suitable.

One or more of the above bulk rolls are then treated in a controlled environment as follows: at 120 degrees Fahrenheit and normal humidity for 72 hours; then 90 degrees Fahrenheit and 90 percent relative humidity for 48 hours. Further storage for at least one week at normal room conditions preferred.

The transfer material and the paper is then separated. The bulk size transfer medium then may be cut and formed as desired. Preferably, the bulk roll is slit and rolled on hubs or spools to thereby make up a number of individual typewriter ribbons. The product produced and the advantages of that product are as described above for the first embodiment.

In the two alternatives specifically described some of the liquid ink in the pores of a matrix transfer medium is removed from those pores prior to use of the medium. Careful calculations have established that those products after all processing in accordance with this invention have an average pore volume which is roughly 95 percent filled with ink, the remaining roughly 5 percent being empty. The mechanism used in the preferred processes to remove the ink from the pores employs the swelling of hygroscopic resins forming the resin body of the transfer medium. However, the treatment used could be simply a pressure treatment between a matrix transfer medium and an absorbent material. Such a pressure treatment has been experimented with somewhat at this time, but it presently appears to require handling and control which would be difficult and expensive to implement commercially within the required tolerances.

In all of the above, it will be clear that the features here described which have to do with the filled or partially empty nature of the pores are not restricted to the form of fabrication described here or in Patent 3,413,184. Specifically, matrix transfer mediums are often made by casting a fluid blend of raw materials on a support, which might be a paper or resinous support, with the support remaining permanently as a part of the final product. Controlling of the relative amount of liquid in the pores formed in such processes in accordance with the above discussions may be done in various ways. Also, the ink need not be liquid at all times. Thus, the ink could be a gel or other solid under ambient conditions so long as it flows when impacted by the high pressures of typing or printing. It is, of course, clear that the stratification of pores between the printing surface and the support layer is not a factor essentially important to the instant invention.

While the invention has been particularly shown and described with reference to preferred embodiment thereof, it will be understood by those skilled in the art that the foregoing and other changes in form and details may be made therein without departing from the spirit scope of the invention.

We claim:

1. A process for making a transfer medium having a hygroscopic resinous body holding flowable ink generally in the manner of a sponge comprising:

mixing a flowable transfer ink and a particulate filler material with a solution of a film forming hygroscopic polymer in a volatile solvent for said polymer to form a dispersion of said ink and filler in said solvent, casting a coating of said dispersion on an absorbent support layer, heating said coating to remove said solvent and form a porous polymer film in the pores of which said ink is distributed, placing said film and support layer in an atmosphere of about 90% relative humidity at a temperature of about 90° F. for at least 24 hours to cause said support layer to absorb a portion of said ink from said pores, such that said ink will not be forced to the surface of said transfer medium in significant amounts under extreme atmospheric conditions which cause said resinous body to swell substantially, and removing said film from said support layer.

2. The process as in claim 1, in which said ink is absorbed by said layer until the volume of the average of said pores in the end product is roughly 95 percent filled with said ink.

3. The process of claim 1 wherein said support layer is paper.

4. The process of claim 3 wherein said paper is relatively impervious to the vapors of said solvent.

5. The process of claim 1 including the step of coating a backing layer to the surface of the film which is opposite to said support layer.

6. The process of claim 1 wherein said film is stored at normal ambient conditions for a period subsequent to treatment under conditions of high humidity and temperature for a period of time prior to removing said film from said support layer.

7. A process for making a transfer medium having a hygroscope resinous body holding flowable ink generally in the manner of a sponge comprising:

mixing a flowable transfer ink and a particulate filler material with a solution of a film forming hygroscopic polymer in a volatile solvent for said polymer to form a dispersion of said ink and said filler in said solvent, casting a coating of said dispersion on a support layer, heating said coating on said support layer to remove said solvent and form a porous polymer film in the pores of which said ink is distributed.

placing a surface of said film in contact with a sheet of absorbent material, treating said film in contact with said sheet in an environment of about 90% relative humidity at a temperature of about 90° F. for at least 24 hours to cause said layer to absorb a portion of said ink from said pores such that said ink will not be forced to the surface of said transfer media in significant amounts under extreme atmospheric conditions which cause said resinous body to swell substantially, and removing said film from said sheet of absorbent material.

8. The process of claim 7 including the steps of coating a backing layer on said film, stripping said film from said support layer, and wherein said sheet of absorbent material is placed in contact with the surface of said film opposite to said backing layer after the removal of said support layer.

9. The process of claim 7 wherein said sheet is paper, said resin is nylon, said filler is woodflour and said solvent is ethyl alcohol.

10. The process of claim 7 wherein said film is stored at normal ambient conditions for at least one week prior to removing said film from said sheet.

References Cited

UNITED STATES PATENTS

| | | | |
|---|---|---|---|
| 1,673,958 | 6/1928 | Vannote | 117—36.1 |
| 3,055,297 | 9/1962 | Leeds | 117—36.1 |
| 3,117,018 | 1/1964 | Strauss | 117—36.1 |
| 3,287,153 | 11/1966 | Schwarz et al. | 117—36.1 |
| 3,303,046 | 2/1967 | Chebiniak et al. | 117—36.1 |
| 3,306,867 | 2/1967 | Popiolek | 117—36.1 |
| 3,314,814 | 4/1967 | Newman | 117—36.1 |
| 3,413,183 | 11/1968 | Findlay et al. | 117—36.2 XR |
| 3,413,184 | 11/1968 | Findlay et al. | 117—36.1 XR |

MURRAY KATZ, Primary Examiner

U.S. Cl. X.R.

117—36.1, 102, 155; 161—160; 264—216, 234, 331